(12) United States Patent
    Sharp

(10) Patent No.: US 10,035,445 B2
(45) Date of Patent: Jul. 31, 2018

(54) HUB AND SUSPENSION ASSEMBLY FOR TOW DOLLY AND CAR HAULER TRAILER WITH DROP-DOWN CAPABILITY

(71) Applicant: Mark Andrew Sharp, Vacaville, CA (US)

(72) Inventor: Mark Andrew Sharp, Vacaville, CA (US)

( * ) Notice: Subject to any disclaimer, the term of this patent is extended or adjusted under 35 U.S.C. 154(b) by 95 days.

(21) Appl. No.: 15/255,003

(22) Filed: Sep. 1, 2016

(65) Prior Publication Data
    US 2018/0056838 A1    Mar. 1, 2018

(51) Int. Cl.
    *B60P 1/02*     (2006.01)
    *B60P 3/077*    (2006.01)
    *B60P 3/12*     (2006.01)

(52) U.S. Cl.
    CPC .............. *B60P 1/02* (2013.01); *B60P 3/077* (2013.01); *B60P 3/122* (2013.01); *B60P 3/127* (2013.01)

(58) Field of Classification Search
    CPC ............ B60P 3/077; B60P 3/122; B60P 3/127
    USPC ....................................................... 280/402
    See application file for complete search history.

(56) References Cited

U.S. PATENT DOCUMENTS

| | | | | |
|---|---|---|---|---|
| 3,137,401 A * | 6/1964 | Curtis | ................. | B60P 3/125 |
| | | | | 280/402 |
| 7,347,436 B1 * | 3/2008 | Fawcett | .............. | B60G 3/01 |
| | | | | 280/124.127 |
| 7,997,606 B1 * | 8/2011 | Sandelius | ........... | B60P 3/077 |
| | | | | 280/402 |
| 8,602,437 B1 * | 12/2013 | Morris | ................. | B60R 9/10 |
| | | | | 280/402 |
| 2003/0020270 A1 * | 1/2003 | Cofer | .................. | B60D 1/36 |
| | | | | 280/763.1 |
| 2007/0181864 A1 * | 8/2007 | Bartee | .................. | B60S 9/18 |
| | | | | 254/424 |

\* cited by examiner

*Primary Examiner* — Joseph M Rocca
*Assistant Examiner* — Felicia L. Brittman
(74) *Attorney, Agent, or Firm* — Craig A. Simmermon

(57) ABSTRACT

A hub and suspension assembly for tow dolly and car hauler trailer with drop-down capability comprises: a suspension tower, a screw, a chuck, a lug member, an upper threaded block, a spring, a lower non-threaded block, an axle, and a hub. The tow dolly comprises: a plurality of frame members, a first and a second hub and suspension assembly for tow dolly and car hauler trailer with drop-down capability, and a first and a second wheel and tire assembly. Car hauler trailer comprises: a plurality of frame members; a first, second, third, and fourth hub and suspension assembly for a tow dolly and a car hauler trailer with drop-down capability; and a first, second, third, and fourth wheel and tire assembly.

9 Claims, 16 Drawing Sheets

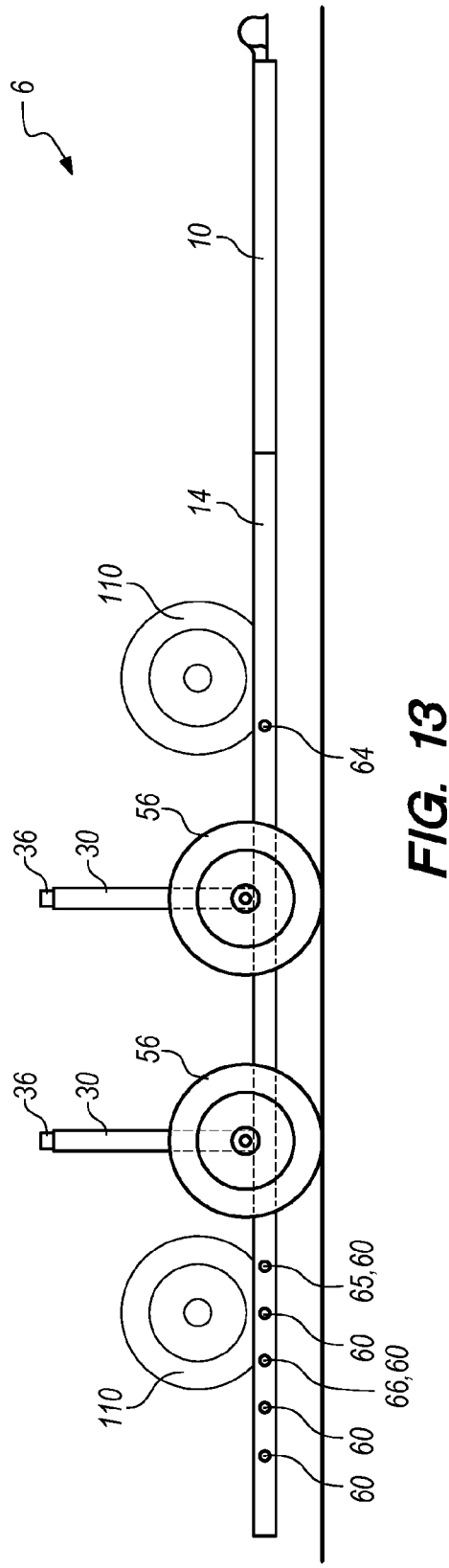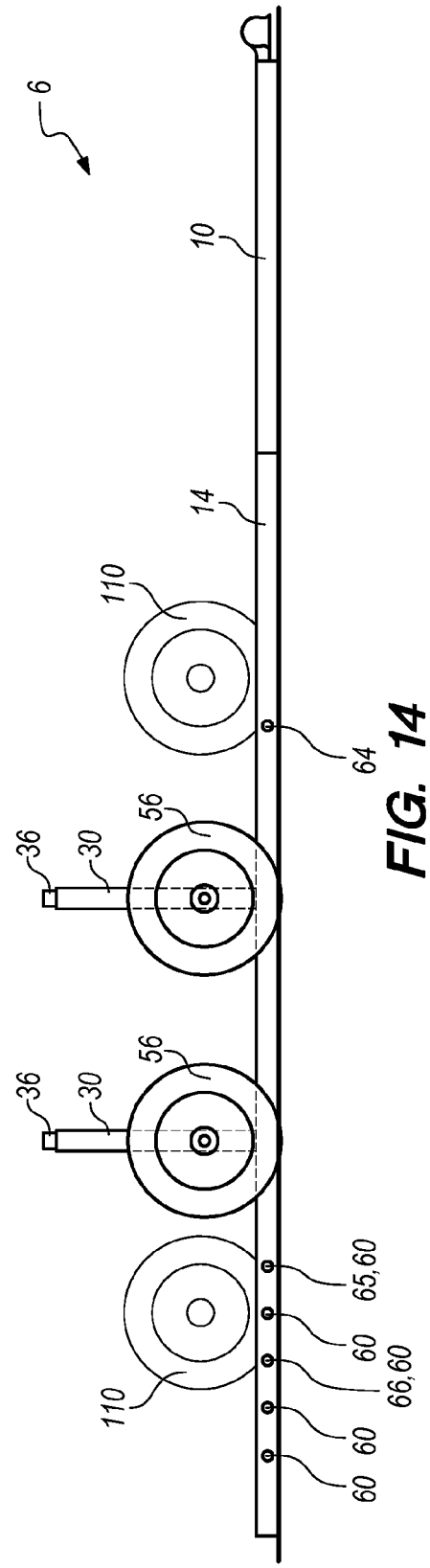

HUB AND SUSPENSION ASSEMBLY FOR TOW DOLLY AND CAR HAULER TRAILER WITH DROP-DOWN CAPABILITY

BACKGROUND OF THE INVENTION

1. Field of the Invention

This invention relates to a tow dolly or a car hauler trailer that is used to tow a vehicle behind another vehicle. A tow dolly or a car hauler trailer is attached to a tow vehicle or lead vehicle such as a car, truck, pick-up, van, or RV. A cargo vehicle is loaded onto or attached to the tow dolly or car hauler trailer so that the tow vehicle may tow the cargo vehicle. This invention relates to a special hub and suspension assembly on a tow dolly or car hauler trailer that has a large degree of height adjustability and allows the hub to be completely lowered down to the road surface or ground, thereby dropping the deck of the tow dolly or car hauler trailer down to the road surface or ground, to enable easier loading and unloading of the cargo vehicle from the tow dolly or car hauler trailer.

2. Description of Related Art

There are many tow dollies and car hauler trailers in the prior art. However, no other tow dollies or car hauler trailers use the special hub and suspension assembly with drop-down capability that includes a screw, a chuck, an upper threaded block, a spring, a lower non-threaded block, and a suspension tower as shown and described below.

BRIEF SUMMARY OF THE INVENTION

It is an aspect of this invention to provide a tow dolly or car hauler trailer with the ability to drop or lower its payload deck or payload cradle from an upper traveling height down to the surface of the road with the rotation of a hand crank or lug bolt so that the tow vehicle may be pushed or driven onto the payload deck or payload cradle.

It is an aspect of this invention to provide a tow dolly or car hauler trailer with the ability to lift or raise its payload deck or payload cradle from the surface of the road to a traveling height with the rotation of a screw member by a hand crank, lug bolt, electric motor, hydraulic motor, or pneumatic motor so that the tow dolly or car hauler trailer may be towed over rough terrain.

It is an aspect of this invention to provide a tow dolly or car hauler trailer with the ability to travel across rough terrain at relatively high speeds without excessive vibrations or movement of the cargo vehicle.

It is an aspect of this invention to provide a tow dolly or car hauler trailer with the ability to take sharp turns at relatively high speeds without excessive movement or shifting of the cargo vehicle.

It is an aspect of hub and suspension assembly for tow dolly and car hauler trailer with drop-down capability to include a screw, a chuck, an upper threaded block, a spring, a lower non-threaded block, and a suspension tower as shown and described below.

It is an aspect of hub and suspension assembly for tow dolly and car hauler trailer with drop-down capability to include a camber wear block and a camber adjustment screw as shown and described below.

BRIEF DESCRIPTION OF THE DRAWINGS

FIG. 13 is a side elevation view of a car hauler trailer with four hub and suspension assemblies for tow dolly and car hauler trailer with drop-down capability wherein all four hub and suspension assemblies for tow dolly and car hauler trailer with drop-down capability are in the raised position with cradle bars raised above road surface.

FIG. 14 is a side elevation view of a car hauler trailer with four hub and suspension assemblies for tow dolly and car hauler trailer with drop-down capability wherein all four hub and suspension assemblies for tow dolly and car hauler trailer with drop-down capability are in the lowered position with cradle bars lowered to contact the road surface.

DEFINITION LIST

Figure 1:
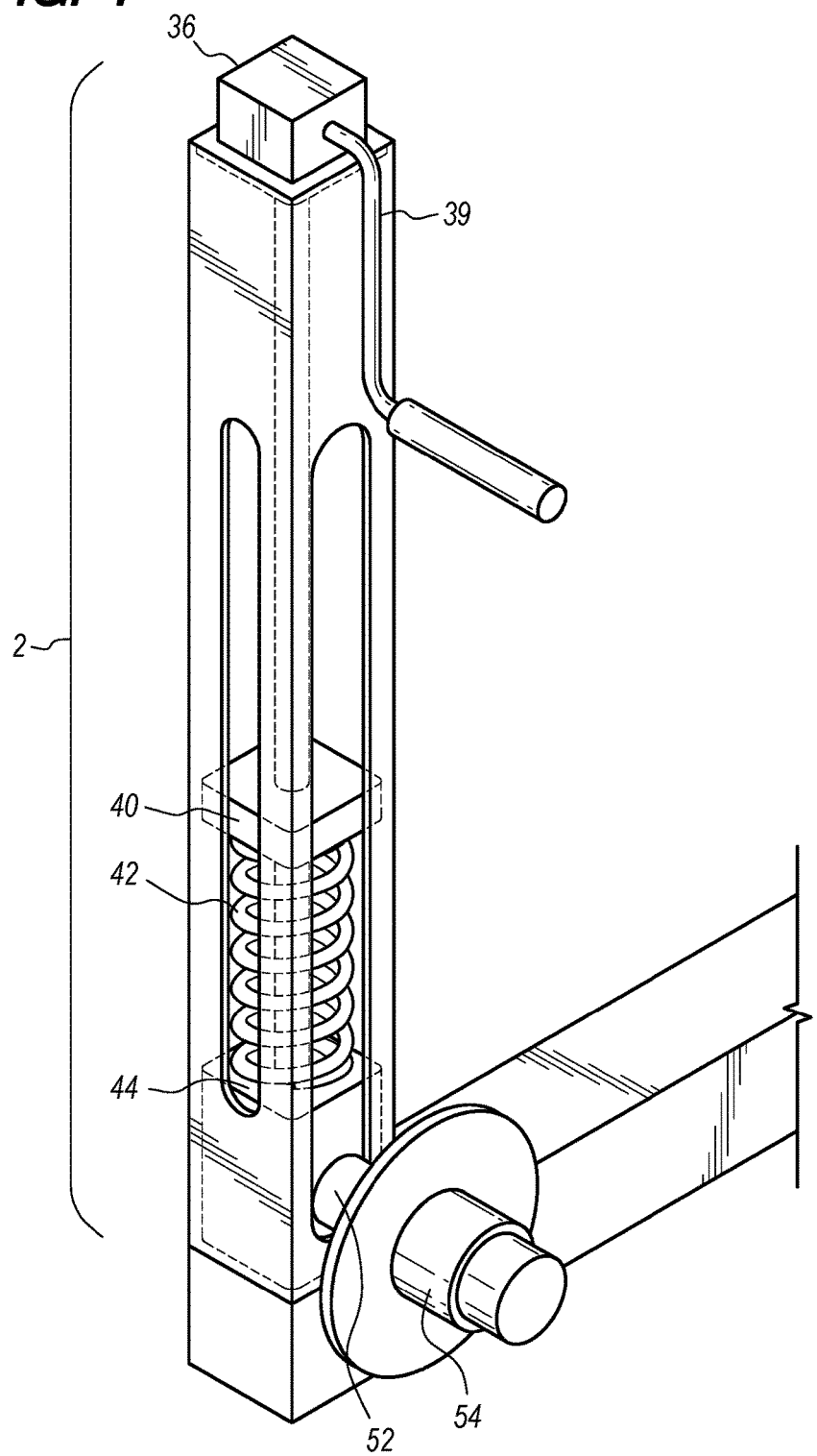
FIG. 1 is a blow up view of hub and suspension assembly for tow dolly and car hauler trailer with drop-down capability.
Figure 2:
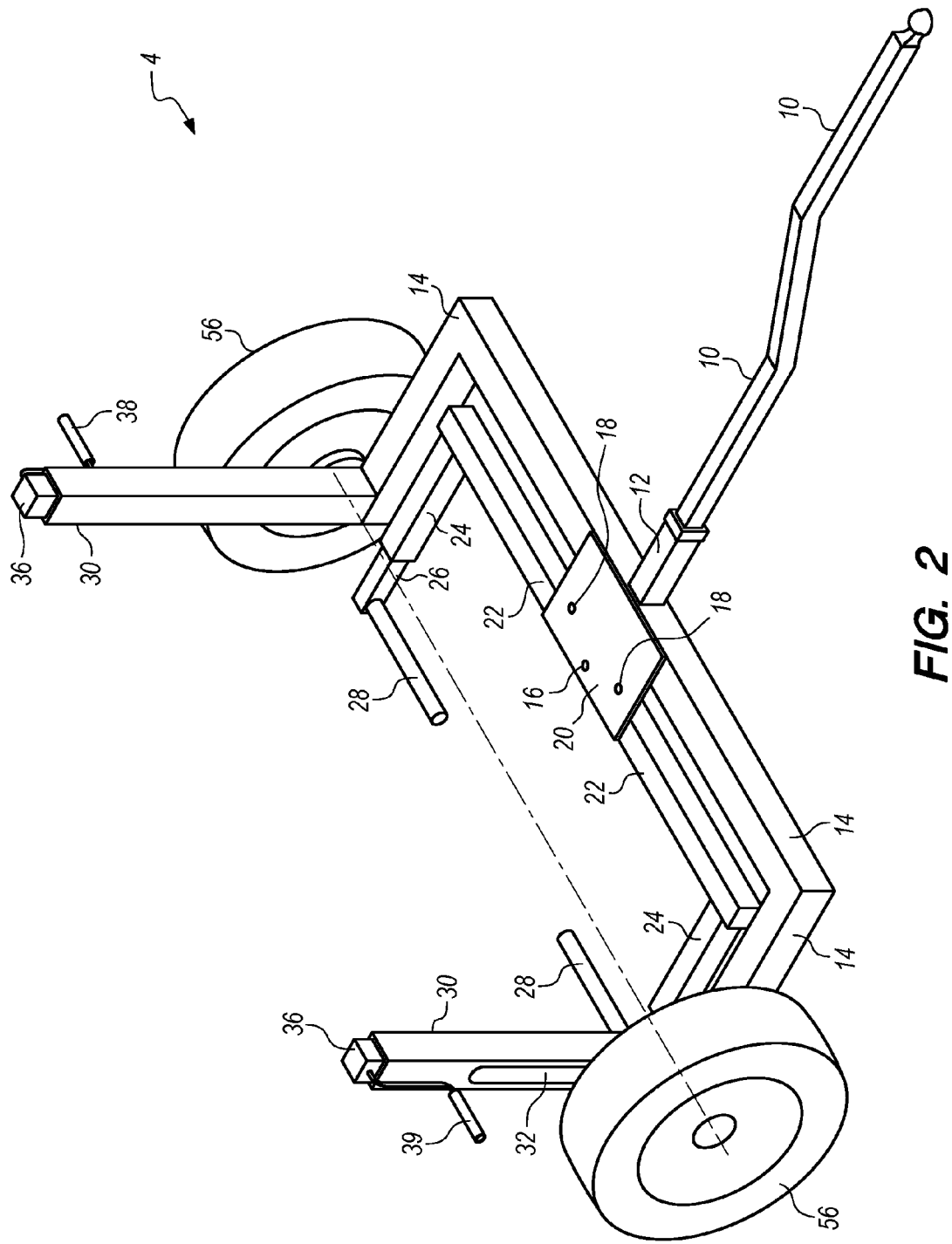
FIG. 2 is a top perspective view of a tow dolly with two hub and suspension assemblies for tow dolly and car hauler trailer with drop-down capability, in the second mode with side cradle bars mounted on the outside, wherein both hub and suspension assemblies for tow dolly and car hauler trailer with drop-down capability are in the raised position.
Figure 3:
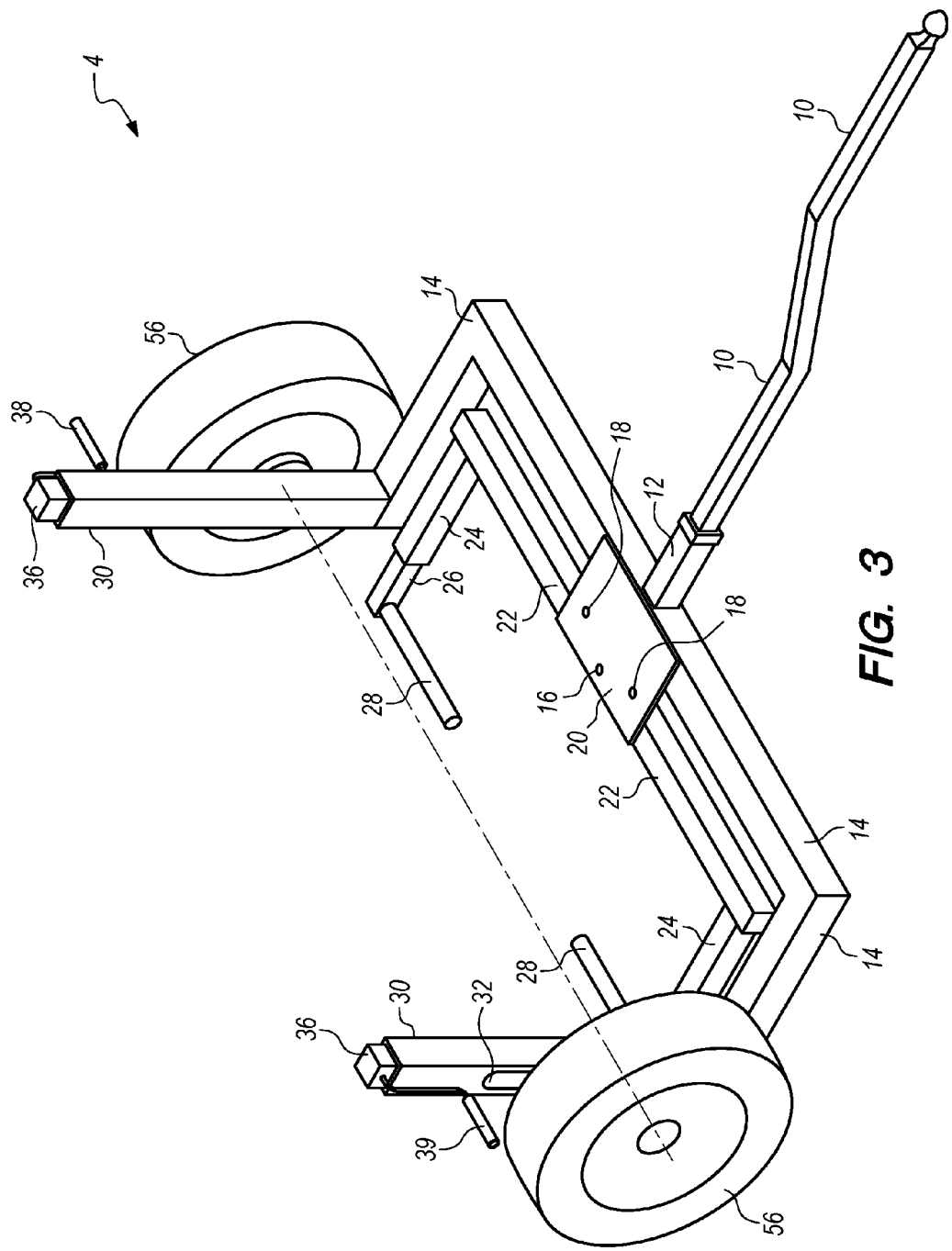
FIG. 3 is a top perspective view of a tow dolly with two hub and suspension assemblies for tow dolly and car hauler trailer with drop-down capability, in the second mode with side cradle bars mounted on the outside, wherein both hub and suspension assemblies for tow dolly and car hauler trailer with drop-down capability are in the lowered position.

| Term | Definition |
| --- | --- |
| 2 | Hub and Suspension Assembly for Tow Dolly and Car Hauler Trailer with Drop-Down Capability |
| 4 | Tow Dolly |
| 6 | Car Hauler Trailer |
| 10 | Tongue |
| 12 | Tongue Receiver |
| 14 | Frame Member |
| 16 | Pivot Pin |
| 18 | Stop Pin |
| 20 | Upper Pivot Plate |
| 22 | Front Cradle Bar |
| 24 | Side Cradle Bar |
| 26 | Telescopic Bar |
| 28 | Rear Cradle Bar |
| 30 | Suspension Tower |
| 32 | Notched Window |
| 33 | Window |
| 34 | Screw |
| 36 | Chuck |
| 38 | Lug Member |
| 39 | Handle Member |
| 40 | Upper Threaded Block |
| 42 | Spring |
| 44 | Lower Non-Threaded Block |
| 46 | Camber Wear Block |
| 48 | Camber Adjustment Screw |
| 49 | Camber Wear Block Slot |
| 50 | Camber Adjustment Access Hole |
| 52 | Axle |
| 54 | Hub |
| 56 | Wheel and Tire Assembly |
| 60 | Cradle Bar Adjustment Hole |
| 62 | Front Wheel Front Cradle Bar |
| 64 | Front Wheel Rear Cradle Bar |
| 66 | Rear Wheel Front Cradle Bar |
| 68 | Rear Wheel Rear Cradle Bar |
| 100 | Cargo Vehicle |
| 110 | Cargo Vehicle Tire |
| 120 | Road Surface |

DETAILED DESCRIPTION OF THE INVENTION

Hub and suspension assembly for tow dolly and car hauler trailer with drop-down capability 2 comprises: a suspension tower 30, a screw 34, a chuck 36, a lug member 38, an upper threaded block 40, a spring 42, a lower non-threaded block 44, an axle 52, and a hub 54.

Screw 34 is a rigid vertical cylindrical member with a height, a diameter, an upper end, a lower end, and an exterior surface. Screw 34 is a substantial and heavy-duty member with diameter ranging from about 0.25-10 inches and height ranging from about 1-6 feet. The height of screw 34 must be larger than the height of spring 42.

Screw 34 has male thread on its exterior surface running from its lower end to its upper end. Male thread is a continuous helical ridge running around the exterior surface of screw 34 in a winding pattern. Male thread on the exterior surface of screw 34 is substantial and heavy-duty with ridge height ranging from about 0.1-1 inches. Male thread on the exterior surface of screw 34 is capable of threaded attachment or engagement with female thread on the upper threaded block 40. In best mode, screw 34 is metallic with the male thread machined or cut into the metallic material. Screw 34 is positioned vertically inside suspension tower 30. As described in detail below, the rotation of screw 34 causes the raising and lowering of lower hub 54 to provide the drop-down capability of hub and suspension assembly for tow dolly and car hauler trailer with drop-down capability 2.

Chuck 36 is mechanical linkage that mechanically connects screw 34, located inside suspension tower 30, to lug member 38, located outside suspension tower 30. Any known mechanical linkage may be used. Chuck 36 is means to mechanical link screw 34 to lug member 38. Any known means of mechanical linkage may be used. Chuck 36 provides the ability to rotate screw 34 in the clockwise and/or counterclockwise directions. Chuck 36 has an upper end and a lower end. The lower end of chuck 36 is rigidly attached to the upper end of screw 34. Attachment may be completed by any known means such as clamping, welding, fastening, gluing, or other attachment means. The rotation of chuck 36 causes rotation of screw 34.

Lug member 38 is a rigid oblong member with a lower end and an upper end. The upper end has a rigid hexagonal head or similar shaped head that may be coupled to a wrench, a socket, or a handle member 39 to allow for the mating therewith and the rotation thereof. The upper end of chuck 36 is rigidly attached to the lower end of lug member 38. The rotation of lug member causes the rotation the linkage.

Hub and suspension assembly for tow dolly and car hauler trailer with drop-down capability 2 may further comprise a handle member 39. Handle member 39 is a hand crank that functions to transfer rotational motion of handle member 39 to rotational motion of lug member 38. Handle member 39 is a hand crank with a handle on one end and a socket member on the other end that is capable of engaging with or mating with lug member 38 to allow a rigid slip-fit connection therewith that is capable of applying rotational force to lug member 38.

As an option to handle member 39, hub and suspension assembly for tow dolly and car hauler trailer with drop-down capability 2 may further comprise a motor. Motor may be hydraulic, electric, or pneumatic. Motor functions to connect with lug member 38 and to transfer rotational motion from the motor to lug member 38, which in turn rotates chuck 36, which in turn rotates screw 34. Motor has a socket member that is capable of engaging with or mating with lug member 38 to allow a rigid slip-fit connection therewith that is capable of applying rotational force to lug member 38.

Upper threaded block 40 is a rigid rectangular cuboid member with a width, a depth, and a height. Rigid rectangular cuboid member has a top surface, a bottom surface, a front surface, a rear surface, an inside surface, and an outside surface. The inside surface is the surface of upper threaded block 40 that faces the inside of the tow dolly 4 or car hauler trailer 6. The outside surface is the surface of upper threaded block 40 that faces the outside of the tow dolly 4 or car hauler trailer 6. The front surface is the surface of upper threaded block 40 that faces the front of the tow dolly 4 or car hauler trailer 6. The rear surface is the surface of upper threaded block 40 that faces the rear of the tow dolly 4 or car hauler trailer 6. Upper threaded block 40 has an interior threaded cavity running vertically from its top surface to its bottom surface. Threaded cavity has an interior surface with female thread running along the interior surface of the vertical cylindrical cavity. Female thread is a continuous helical ridge running around the interior surface of the vertical cylindrical cavity in a winding pattern. Female thread is substantial and heavy-duty with ridge height ranging from about 0.1-1 inches. Female thread is capable of threaded attachment or engagement with the male thread on screw 34. Engagement is such that the rotation of screw 34, while holding upper threaded block 40 still, causes the travel of upper threaded block 40 along screw 34 and vice versa. In this way, upper threaded block 40 functions like a large nut on a large bolt that is screw 34. The width and depth of upper threaded block 40 are sized to make a slip-fit with the inner width and inner depth of suspension tower 30. Width of upper threaded block 40 ranges from 2-12 inches. Depth of upper threaded block 40 ranges from 2-12 inches. Height of upper threaded block 40 ranges from 0.5-12 inches. In best mode, upper threaded block 40 is metallic with the female thread machined or cut into the metallic material.

Spring 42 is a vertical coil spring with a height, an outer diameter, an inner diameter, an upper end, and a lower end. A coil spring is a helical winding of spring steel that is a cylindrical coil of spring steel. The height of spring 42 may be compressed or stretched from an equilibrium point, where properties of the coil spring cause the coil spring to return to the equilibrium point. The inner diameter of spring 42 must be greater than the diameter of screw 34, so that screw 34 may be inserted through the inner diameter of spring 42 to make a clearance-fit there between. The outer diameter of spring 42 must be less than the inner width and the inner depth of suspension tower 30, so that spring 42 may be inserted inside suspension tower 30 to make a clearance-fit there between, as described below. Spring 42 has a height of about 0.5-5 feet. Spring 42 has outer diameter of about 2-12 inches. Spring 42 has inner diameter of about 0.5-10 inches.

Lower non-threaded block 44 is a rigid rectangular cuboid member with a width, a depth, and a height. Rigid rectangular cuboid member has a top surface, a bottom surface, a front surface, a rear surface, an inside surface, and an outside surface. The inside surface is the surface of lower non-threaded block 44 that faces the inside of the tow dolly 4 or car hauler trailer 6. The outside surface is the surface of lower non-threaded block 44 that faces the outside of the tow dolly 4 or car hauler trailer 6. The front surface is the surface of lower non-threaded block 44 that faces the front of the tow dolly 4 or car hauler trailer 6. The rear surface is the surface of lower non-threaded block 44 that faces the rear of the tow dolly 4 or car hauler trailer 6. Lower non-threaded block 44 has an interior cylindrical cavity running vertically from its top surface to its bottom surface. Cylindrical cavity has an inner diameter that is greater than the outer diameter of screw 34 so that screw 34 forms a clearance-fit with the cylindrical cavity in lower non-threaded block 44 wherein lower non-threaded block 44 may be slideably attached to screw 34. The width and depth of lower non-threaded block 44 are sized to make a slip-fit with the inner width and inner depth of suspension tower 30. Width of lower non-threaded block 44 ranges from 2-12 inches. Depth of lower non-threaded block 44 ranges from 2-12 inches. Height of lower non-threaded block 44 ranges from 0.5-12 inches. In best mode, lower non-threaded block 44 is metallic with the cylindrical cavity machined or cut into the metallic material.

Figure 16:
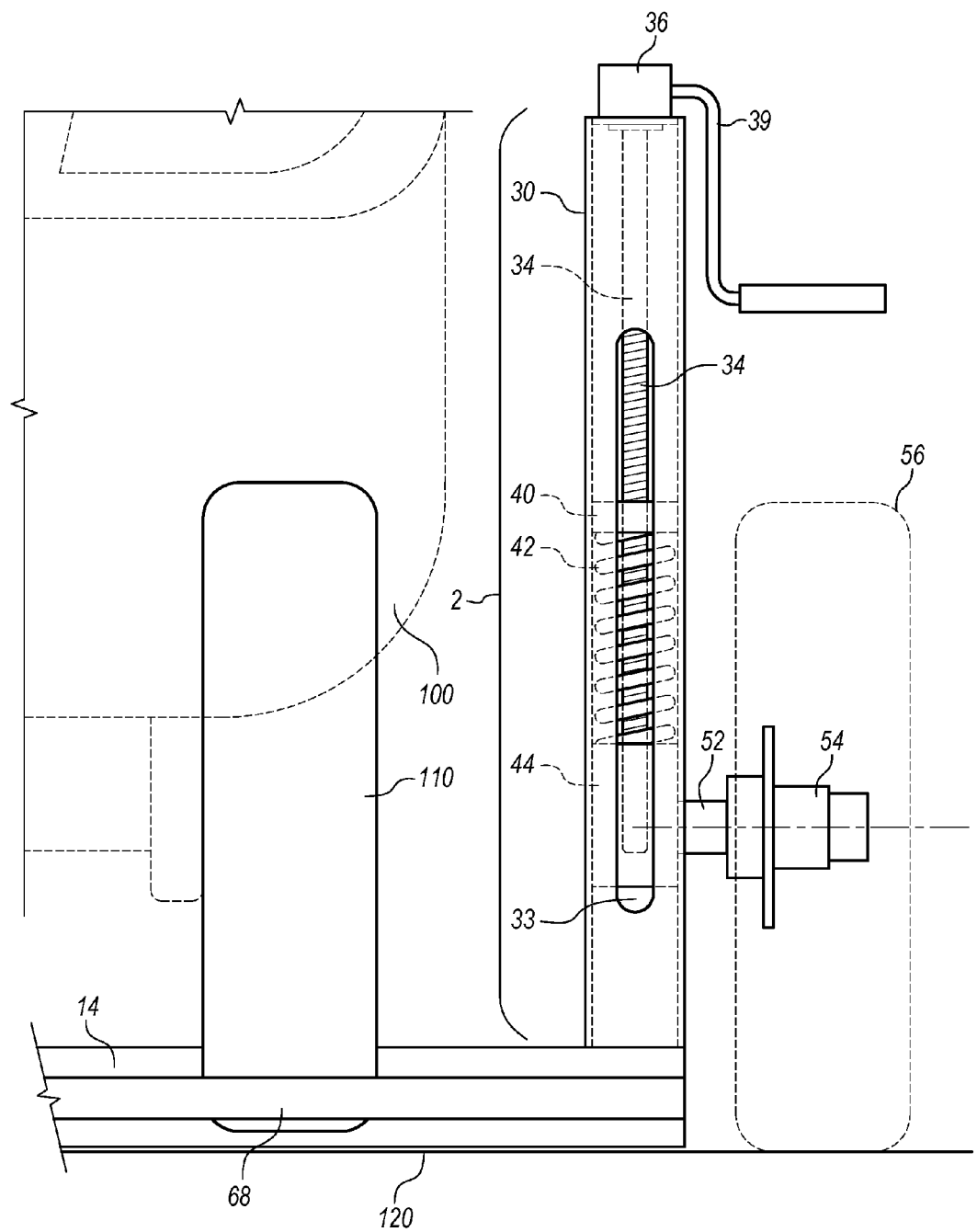
FIG. 16 is a blow-up cutaway view of a hub and suspension assembly for tow dolly and car hauler trailer with drop-down capability on a car hauler trailer, with hub and suspension assembly for tow dolly and car hauler trailer with drop-down capability in the lowered position, with cradle bars lowered to contact the road surface.
Figure 17:
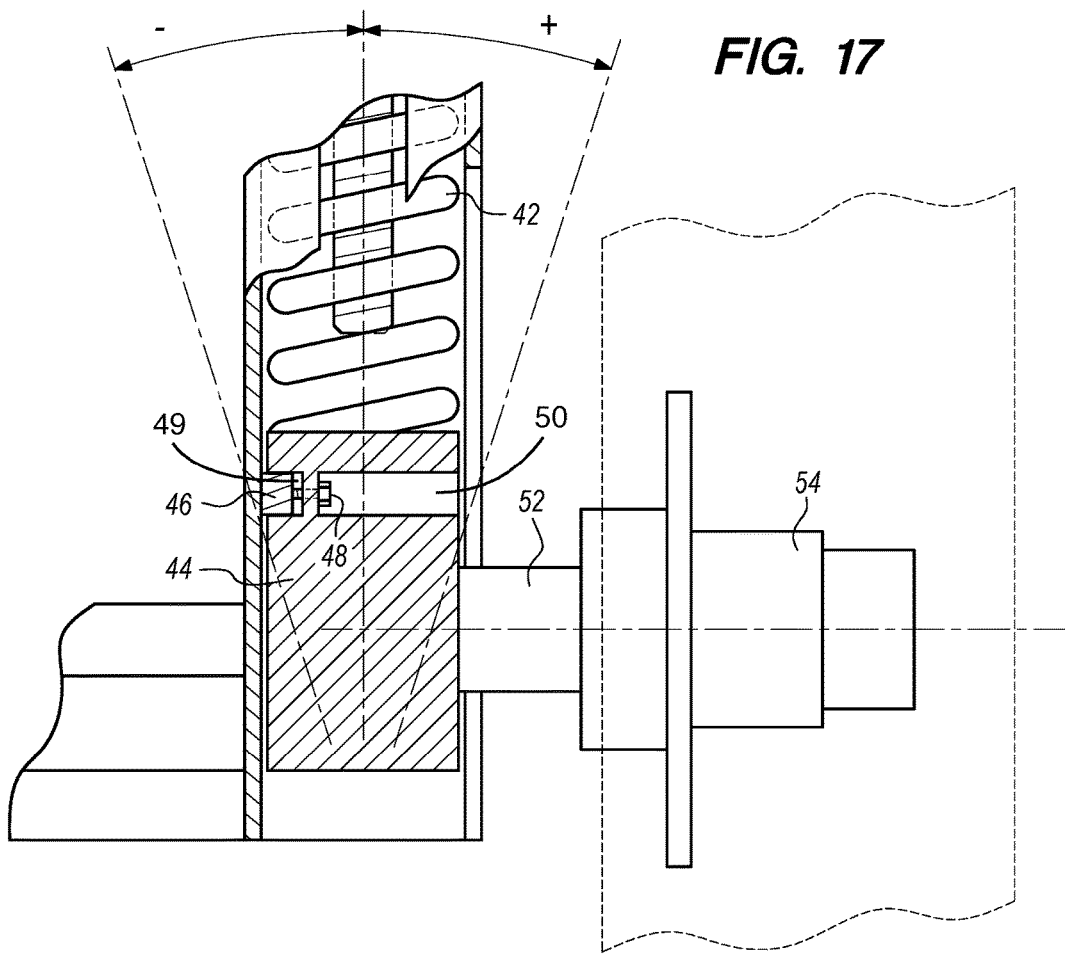
FIG. 17 is a blow-up cutaway view of lower non-threaded block with optional camber wear block and camber adjustment screw installed.
Figure 18:
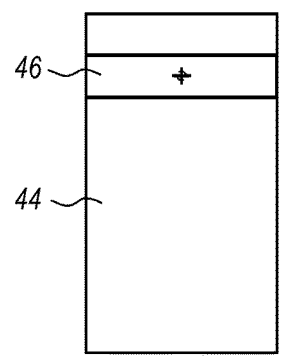
FIG. 18 is an elevation view of the inside surface of lower non-threaded block with optional camber wear block and camber adjustment screw installed.

Optionally, hub and suspension assembly for tow dolly and car hauler trailer with drop-down capability 2 may further comprise: a wear block 46 and a camber adjustment screw 48, wherein lower non-threaded block 44 may further comprise: a camber wear block slot 49 and a camber adjustment access hole 50. This option provides the ability to set and adjust the camber angle or toe of the tow dolly 4 or car hauler trailer 6. Camber angle or toe is the angle that each wheel makes with the longitudinal axis of the vehicle. The proper camber angle or toe provides increased stability and allows for smooth transport of the cargo vehicle 100 over uneven terrain and through sharp cornering. Camber wear block 46 is a rigid solid rectangular cuboid member with a length, a height, a depth, an inside surface, and an outside surface. Camber wear block 46 is made of a hard material such as hardened steel, stainless steel, plated metal, or chromed metal. Camber wear block slot 49 is a horizontal rectangular channel through the inside surface of lower non-threaded block 44. Camber wear block slot 49 has a length, a height, and a depth. The length and height of camber wear block 46 is sized to make a slip-fit inside the length and height of camber wear block slot 49, respectively. The depth of camber wear block 46 is slightly larger than that of camber wear block slot 49. Camber adjustment screw 48 is rigid horizontal member with male thread at one end and a head at the other end such as a screw or bolt. Camber adjustment access hole 50 is a horizontal cylindrical cavity in the outside surface of lower non-threaded block 44. Camber adjustment access hole 50 has a depth and a diameter. The diameter of camber adjustment access hole 50 is large enough to provide clearance for a socket, driver, or wrench to couple to the head on camber adjustment screw 48. The longitudinal axis of camber adjustment access hole 50 is perpendicular to the longitudinal axis of camber wear block slot 49 and is aligned with the midpoint or bisect of camber wear block slot 49. A tapped hole is located at the bottom of camber adjustment access hole 50 with a longitudinal axis that is aligned with that of camber adjustment access hole 50. Tapped hole has female thread that is sized to couple with male thread on camber adjustment screw 48. Camber adjustment screw 48 is threaded into this tapped hole as depicted in FIG. 16. Camber wear block 46 is installed into lower non-threaded block 44 by aligning camber wear block 46 with camber wear block slot 49 and pressing camber wear block 46 into camber wear block slot 49 and then inserting into the lower end of suspension tower 30 to hold camber wear block 46 in place. Camber wear block 46 is held in place by the inside side of suspension tower 30 pressing against the inside surface of camber wear block 46 and the male tread end of camber adjustment screw pressing against the outside surface of camber wear block 46, as depicted in FIG. 16. Rotation of the head on camber adjustment screw 48 in one direction causes an increase in camber angle and rotation of the head on camber adjustment screw 48 in the other direction causes a decrease in camber angle of hub 54. In this way the proper camber angle of each wheel and tire assembly 56 of tow dolly 4 and each wheel and tire assembly of car hauler trailer 6 can be set and adjusted.

Hub 54 is a hub with an inside side and an outside side. The inside side is the side of hub 54 that faces the inside of the tow dolly 4 or car hauler trailer 6. The outside side is the side of hub 54 that faces the outside of the tow dolly 4 or car hauler trailer 6. A hub is a bearing that functions to pivotally attach a wheel to an axle. Hub 54 is a standard hub for a car or light truck vehicle. Axle 52 is an axle with an inside end and an outside end. The inside end is the end of axle 52 that faces the inside of the tow dolly 4 or car hauler trailer 6. The outside end is the end of axle 52 that faces the outside of the tow dolly 4 or car hauler trailer 6. An axle is a rigid horizontal cylindrical member that attaches to a hub and functions support the weight of a vehicle above it. Axle 52 is a standard type of axle for a car or light truck vehicle. The inside end of axle 52 is rigidly attached to the outside surface of lower non-threaded block 44. The outside end of axle 52 is rigidly attached to the inside side of hub 54. Attachment is such that axle 52 is horizontal and perpendicular to the cylindrical cavity in lower non-threaded block 44. Rigid attachment can be accomplished by any known means such as welding, gluing, fastening, riveting, epoxying, or similar. The wheel and tire assembly 56 of the tow dolly 4 or car hauler trailer 6 is attached to the outside side of hub 54 in the usual way. Wheel and tire assembly 56 is not claimed component of hub and suspension assembly for tow dolly and car hauler trailer with drop-down capability 2.

Suspension tower 30 is a vertical support member. Suspension tower 30 is a rigid hollow rectangular cuboid member with a upper side, front side, a rear side, an inside side, and an outside side, wherein each side has an upper end, an upper half, a lower end, and a lower half. The inside side is the side of suspension tower 30 that faces the inside of the tow dolly 4 or car hauler trailer 6. The outside side is the side of suspension tower 30 that faces the outside of the tow dolly 4 or car hauler trailer 6. The front side is the side of suspension tower 30 that faces the front of the tow dolly 4 or car hauler trailer 6. The rear side is the side of suspension tower 30 that faces the rear of the tow dolly 4 or car hauler trailer 6. The upper side of suspension tower 30 has a clearance hole and a reinforced lip member to retain the lower end of chuck 36 within the interior suspension tower 30. As described below, screw 34, upper threaded block 40, spring 42, and lower non-threaded block 44 are installed within the hollow interior of suspension tower 30. This design causes the full weight of the cargo vehicle 100, along with the full weight of the tow dolly 4 or car hauler trailer 6, to press upwards on screw 34 and chuck 36 where screw 34 and chuck 36 must be retained within suspension tower 30 to prevent failure of the suspension system. Clearance hole on upper side of suspension tower 30 provides clearance for the upper end of chuck 36 to protrude through suspension tower while reinforced lip member retains the lower end of chuck 36 within suspension tower, as depicted. Alternately, clearance hole may provide clearance for just the lug member 38 to protrude through suspension tower. A wrench, socket, or handle member 39 may be coupled to lug member 38. Suspension tower 30 does not have a lower side because suspension tower 30 is open at the bottom. Suspension tower 30 has an inner width, an outer width, an inner depth, an outer depth, and a height. The height of suspension tower 30 must be greater than the outer width and the outer depth of suspension tower 30. The inner width of suspension tower 30 ranges from about 0.5-10 inches. The inner depth of suspension tower 30 ranges from about 0.5-10 inches. In best mode, the inner width of suspension tower 30 equals the inner depth of suspension tower 30.

The outer surface of suspension tower 30 has a notched window 32. Notched window 32 is an oblong hole or slot-shaped void in the outer surface of suspension tower 30. Notched window 32 has a width, a height, a lower end, and an upper end. The longitudinal axis of notched window 32 is vertical and parallel with that of suspension tower 30. Notched window 32 extends from the lower end of the outside surface of suspension tower 30 to the upper half of the outside surface of suspension tower 30. The lower end of notched window 32 breaks through the lower end of the outside surface of suspension tower 30 to yield a notch or clearance channel in the lower end of the outside surface of suspension tower 30 to allow access to the notched window 32 from outside of the suspension tower 30. The upper end of notched window does not break through the upper end of the outside surface of suspension tower 30. As described below, the notch in notched window 32 is necessary to provide clearance for axle 52 and hub 54 when installing lower non-threaded block 44 into suspension tower 30.

Optionally, the rear surface of suspension tower 30 may further comprise a window 33. Window 33 is an oblong hole or slot-shaped void in the rear surface of suspension tower 30. Window 33 has a width and a height. The longitudinal axis of window 33 is vertical and parallel with that of suspension tower 30. Window 33 extends from the lower half of the rear surface of suspension tower 30 to the upper half of the rear surface of suspension tower 30. Window 33 does not break through the lower end of the rear surface of suspension tower. Window 33 functions to allow for visual inspection and location reference of upper threaded block 40, spring 42, and lower non-threaded block 44 from the rear of hub and suspension assembly for tow dolly and car hauler trailer with drop-down capability 2. Such visual inspection capability allows for quick and easy determination of the location of lower non-threaded block 44 including whether lower non-threaded block 44 is in the raised or lowered. As discussed below, upper threaded block 40, spring 42, and lower non-threaded block 44 are raised and lowered to provide the drop-down capability of hub and suspension assembly for tow dolly and car hauler trailer with drop-down capability 2.

The procedure to assemble hub and suspension assembly for tow dolly and car hauler trailer with drop-down capability 2 is as follows. Screw 34 is threaded through upper threaded block 40 by threading the upper end of screw 34 into the threaded cavity on the bottom surface of upper threaded block 40 and rotating screw 34 until the upper end of screw 34 protrudes through the threaded cavity on the top surface of upper threaded block 40. Chuck 36 is then rigidly attached to the upper end of screw 34. The upper end of spring 42 is placed over the lower end of screw 34 and spring 42 is slid upwards until the upper end of spring 42 contacts the bottom surface of upper threaded block 40. Screw 34 is then threaded through lower non-threaded block 44 by inserting the lower end of screw 34 into the cylindrical cavity on the top surface of lower non-threaded block 44 and sliding lower non-threaded block 44 upwards until the top surface of lower non-threaded block 44 contacts the lower end of spring 42. Next, the entire assembly of screw 34, chuck 36, upper threaded block 40, spring 42, and lower non-threaded block 44, with attached axle 52 and hub 54, is inserted into the lower end of suspension tower 30. The upper end of screw 34, with attached chuck 36, is inserted into the open bottom of suspension tower 30, and inserted all the way up so that chuck 36 contacts the upper side of suspension tower 30 and lug member 38 protrudes through the clearance hole on the upper side of suspension tower 30. In so doing, special care must be taken to align the width and depth of the upper threaded block 40 and that of the lower non-threaded block 44 with the inner width and inner depth of suspension tower 30 in order to align the slip-fit between these members. Also, special care must be taken to guide axle 52 and hub 54 through the notch in notched window 32 as the lower non-threaded block 44 is inserted into suspension tower 30.

Tow dolly 4 comprises: a plurality of frame members 14, a first and second hub and suspension assembly for tow dolly and car hauler trailer with drop-down capability 2, and a first and second wheel and tire assembly 56. First and second hub and suspension assembly for tow dolly and car hauler trailer with drop-down capability 2 are welded, fastened, glued, or epoxied to a frame member 14 of tow dolly 4. The inside side of first and second suspension tower 30 is welded, fastened, glued, or epoxied to a frame member 14, as depicted in FIGS. 1-8.

Figure 4:
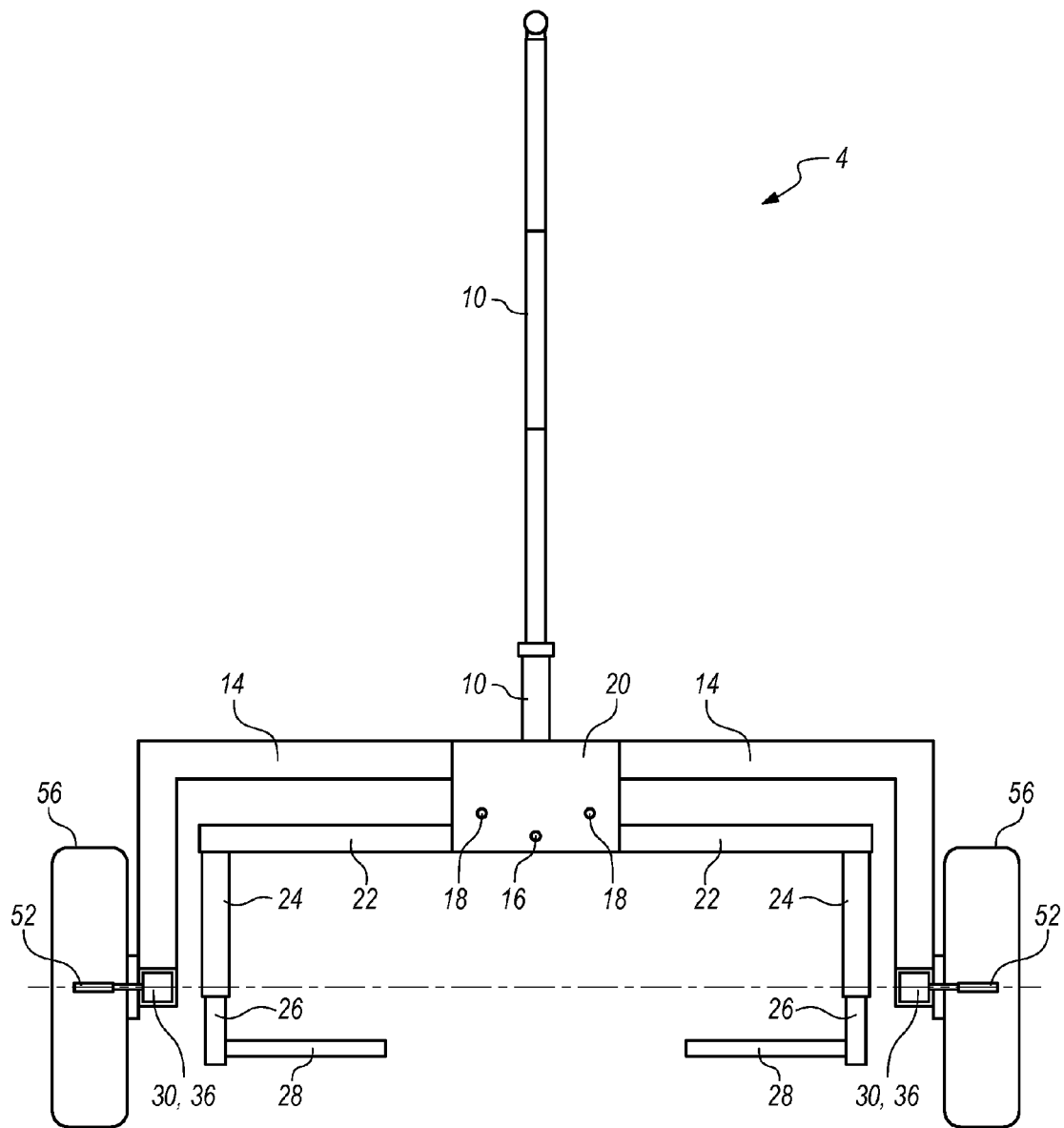
FIG. 4 is a top plan view of a tow dolly with two hub and suspension assemblies for tow dolly and car hauler trailer with drop-down capability, in the second mode with side cradle bars mounted on the outside.
Figure 5:
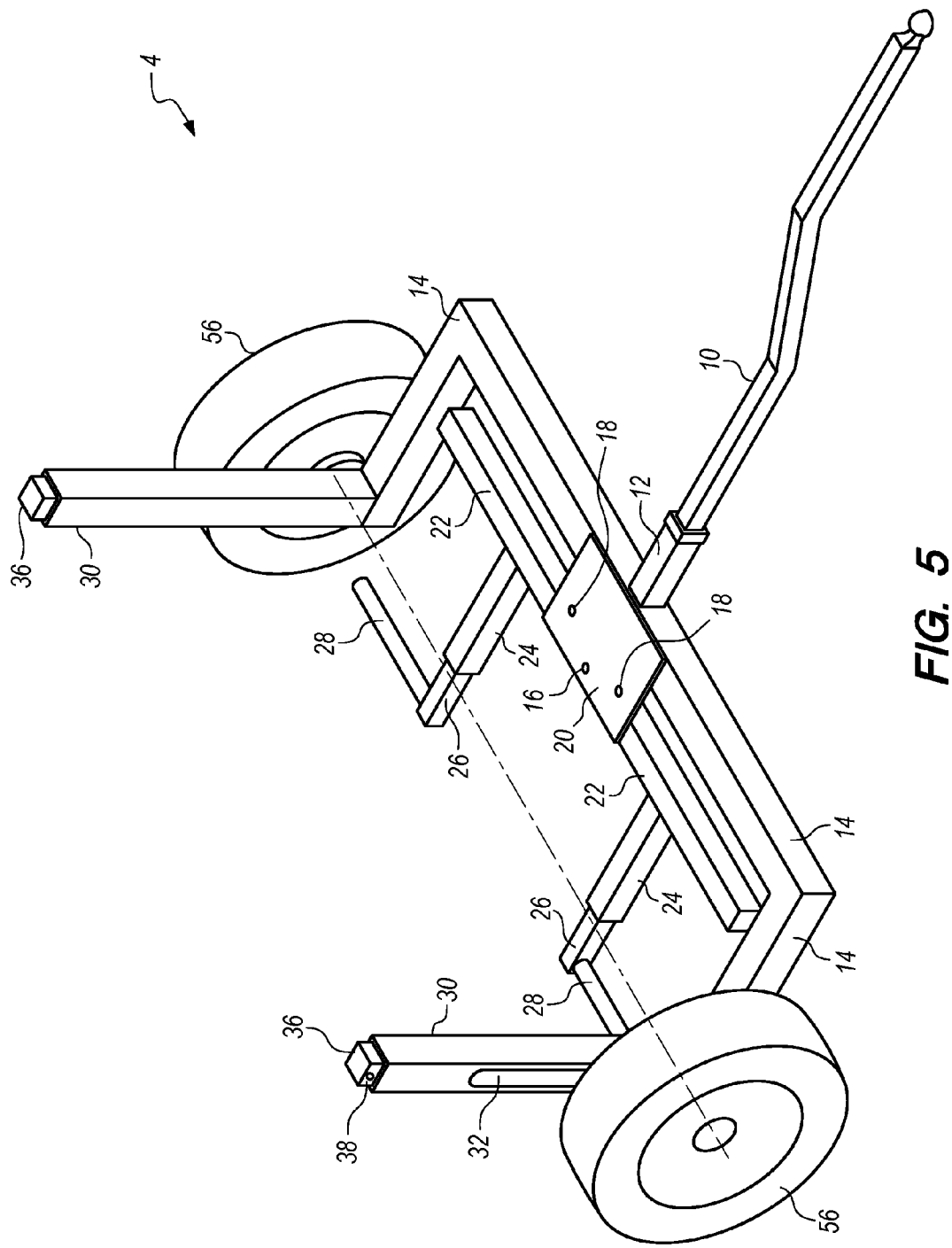
FIG. 5 is a top perspective view of a tow dolly with two hub and suspension assemblies for tow dolly and car hauler trailer with drop-down capability, in the first mode with side cradle bars mounted on the inside, wherein both hub and suspension assemblies for tow dolly and car hauler trailer with drop-down capability are in the raised position.
Figure 6:
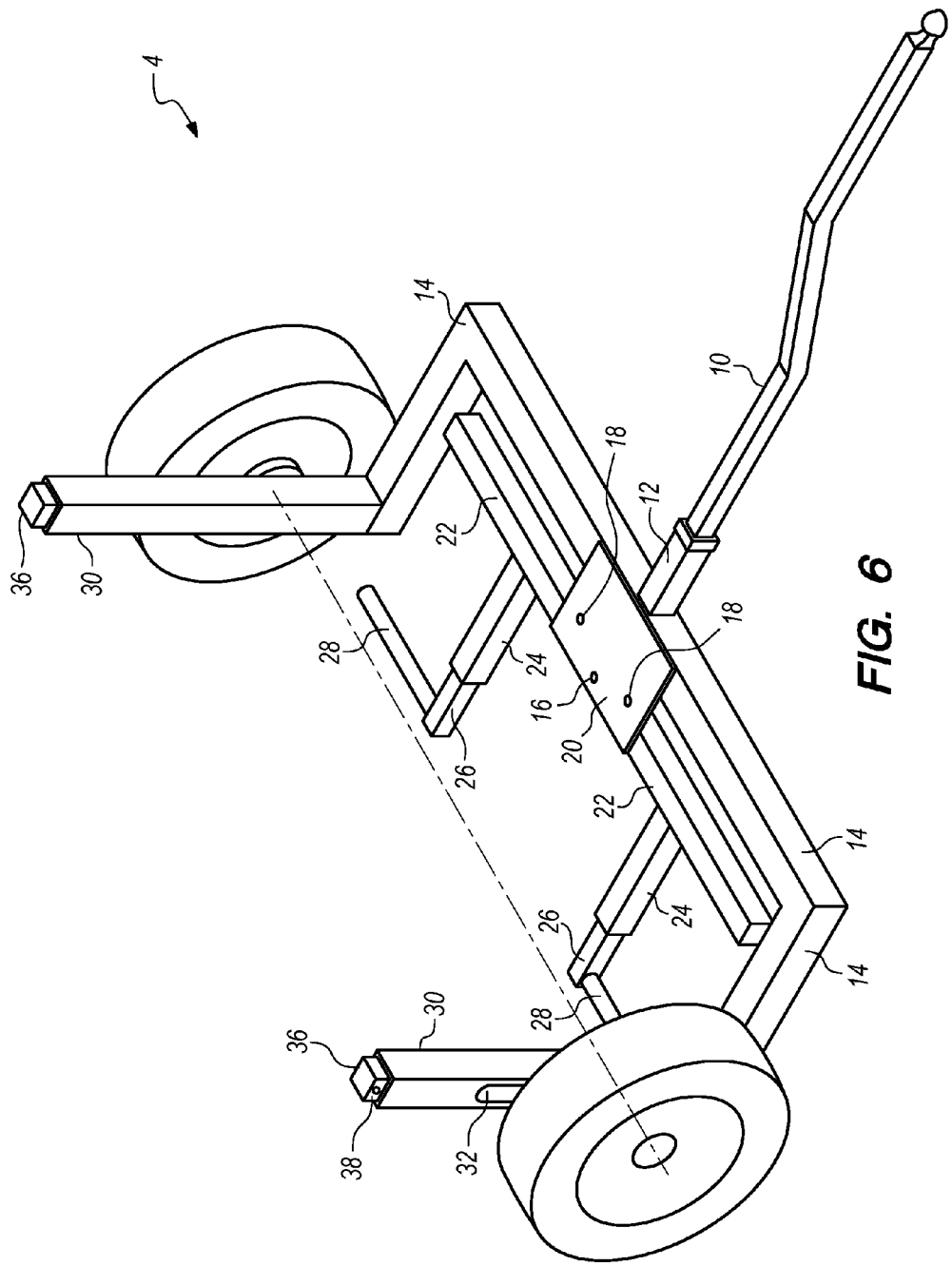
FIG. 6 is a top perspective view of a tow dolly with two hub and suspension assemblies for tow dolly and car hauler trailer with drop-down capability, in the first mode with side cradle bars mounted on the inside, wherein both hub and suspension assemblies for tow dolly and car hauler trailer with drop-down capability are in the lowered position.

Tow dolly 4 further comprises: a front cradle bar 22, a first and second side cradle bar 24, a first a second telescopic bar 26, and a first and second rear cradle bar 28. Front cradle bar 22 is a rigid horizontal support member with a left end, a left half, a mid-point pivot hole, a right half, a right end, and a height. Mid-point pivot hole is a vertical cylindrical hole through front cradle bar 22 at its mid-point with inside diameter that is slightly large than the diameter of pivot pin 16. Front cradle bar functions to support first and second side cradle bars 24, first and second telescopic bars 26, and first and second rear cradle bars 28. Each side cradle bar 24 is a rigid horizontal support member with a front end and a rear end. The front end of first side cradle bar 24 is rigidly attached to the left half of front cradle bar 22. In a first mode, first side cradle bar 24 is located closer to the mid-point pivot hole of front cradle bar 22, as depicted in FIGS. 4-6. In a second mode, first side cradle bar 24 is located at the left end of front cradle bar 22, as depicted in FIGS. 1-3, 7, and 8. The front end of the second side cradle bar 24 is rigidly attached to the right half of front cradle bar 22. In the first mode, second side cradle bar 24 is located closer to the mid-point pivot hole of front cradle bar 22, as depicted in FIGS. 4-6. In the second mode, second side cradle bar 24 is located at the right end of front cradle bar 22, as depicted in FIGS. 1-3, 7, and 8. Attachment of side cradle bars 24 is such that first and second side cradle bars are perpendicular to the front cradle bar 22, as depicted in FIGS. 1-8. Each side cradle bar 24 is hollow with an inner width and an inner height. The rear end of each side cradle bar 24 is open. Each telescopic bar 26 is a rigid horizontal support member with a front, a rear end, an outer width, and an outer height. The outer width of telescopic bar 26 is sized to make a clearance-fit with the inner width of side cradle bar 24. The outer depth of telescopic bar 26 is sized to make a clearance-fit with the inner depth of side cradle bar 24. The front end of first telescopic bar 26 is inserted into the rear end of first side cradle bar 24. The front end of second telescopic bar 26 is inserted into the rear end of second side cradle bar 24. With this arrangement, each telescopic bar 26 "telescopes" inside a side cradle bar 24. Each rear cradle bar 28 is a rigid horizontal member with a left end and a right end. In the first mode, the right end of first rear cradle bar 28 is rigidly attached to the rear end of the first telescopic bar 26 and the left end of second rear cradle bar 28 is rigidly attached to the rear end of the second telescopic bar 26, as depicted in FIGS. 4-6. In the second mode, the left end of first rear cradle bar is rigidly attached to the rear end of the first telescopic bar 26 and the right end of second rear cradle bar 28 is rigidly attached to the rear end of the second telescopic bar 26, as depicted in FIGS. 1-3, 7, and 8. First rear cradle bar 28 is perpendicular to first telescopic bar 26 and second rear cradle bar 28 is perpendicular to the second telescopic bar 26.

The whole assembly of: front cradle bar 22, first and second side cradle bars 24, first a second telescopic bars 26, and first and second rear cradle bars 28 is designated as a cradle assembly. The cradle assembly cradles or holds a cargo vehicle tire 110. The cradle assembly is pivotally attached to a frame member 14 of tow dolly 4 with a pivot pin 16, an upper pivot plate 20, and lower pivot plate (not depicted), and a left and right stop pin 18. Upper pivot plate 20 and lower pivot plate are each a rigid horizontal planar member with a front half, a rear half, a left half, and a right half. Upper pivot plate 20 and lower pivot plate are duplicate parts. The front half of upper pivot plate 20 is rigidly attached to the frame member 14 of tow dolly 4 and the front half of lower pivot plate is rigidly attached to the frame member 14 of tow dolly 4 so that the distance between upper and lower pivot plates is slightly greater than the height of front cradle bar 22 to create a clearance-fit between the front cradle bar 22 and the upper and lower pivot plates, as depicted. Front cradle bar 22 is pivotally attached to each pivot plate with pivot pin 16. Pivot pin 16 is a rigid solid vertical cylindrical member with an upper end, a lower end, and a diameter. Pivot pin 16 is inserted through mid-point pivot hole on front cradle bar 22. The upper end of pivot pin 16 is rigidly attached to the upper pivot plate 20. The lower end of pivot pin 16 is rigidly attached to the lower pivot plate. In this way, the cradle assembly is pivotally attached to upper and lower pivot plates. Left and right stop pins 18 are used to restrain the pivoting of the cradle assembly. Each stop pin 18 is a rigid solid vertical cylindrical member with an upper end and a lower end. Each stop pin 18 is positioned in between the tow dolly frame member 14 and the front cradle bar 22 as depicted. The upper end of the left stop pin 18 is rigidly attached to the upper pivot plate 20. The upper end of the right stop pin 18 is rigidly attached to the upper pivot plate 20. The lower end of the left stop pin 18 is rigidly attached to the lower pivot plate. The lower end of the right stop pin 18 is rigidly attached to the lower pivot plate.

To raise and lower hub and suspension assembly for tow dolly and car hauler trailer with drop-down capability 2, screw 34 is rotated via chuck 36. Screw 34 may be rotated in either the clockwise or counterclockwise direction. Rotation of screw 34 in the clockwise causes upper threaded block 40 to travel vertically upwards vertically along the longitudinal axis of screw 34 because of the threaded connection between these members. Rotation of screw 34 in counterclockwise direction causes upper threaded block 40 to travel vertically downwards along the longitudinal axis of screw 34 because of the threaded connection between these members. All vertical movement of upper threaded block 40 causes the mirrored vertical movement of spring 42 and lower non-threaded block 44 of because the weight of the tow dolly 4 or car hauler trailer 6 continuously pushes spring 42 and lower non-threaded block 44 upwards against the bottom surface of upper threaded block 40 to retain it in that position.

Figure 7:
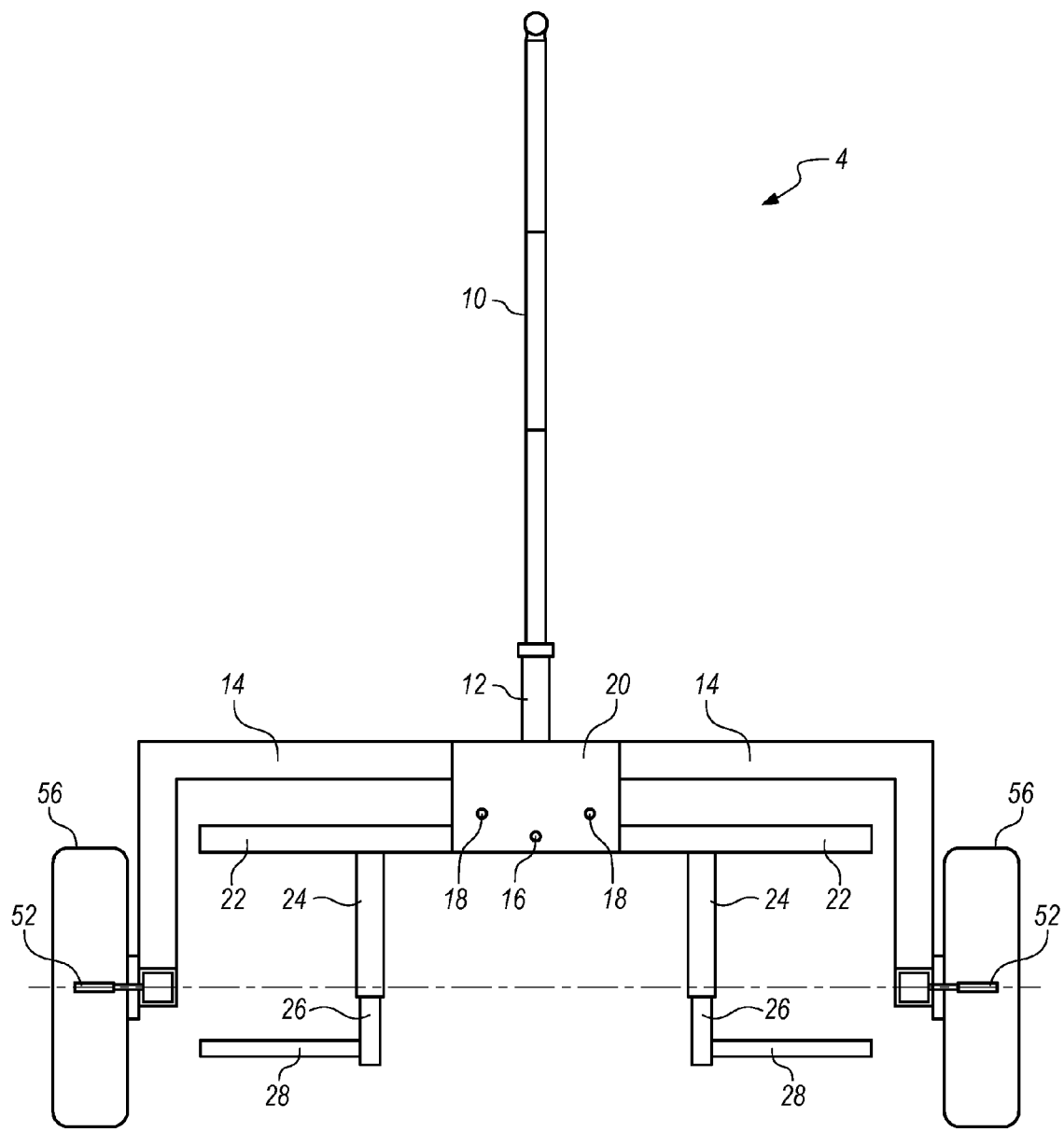
FIG. 7 is a top plan view of a tow dolly with two hub and suspension assemblies for tow dolly and car hauler trailer with drop-down capability, in the first mode with side cradle bars mounted on the inside.
Figure 8:
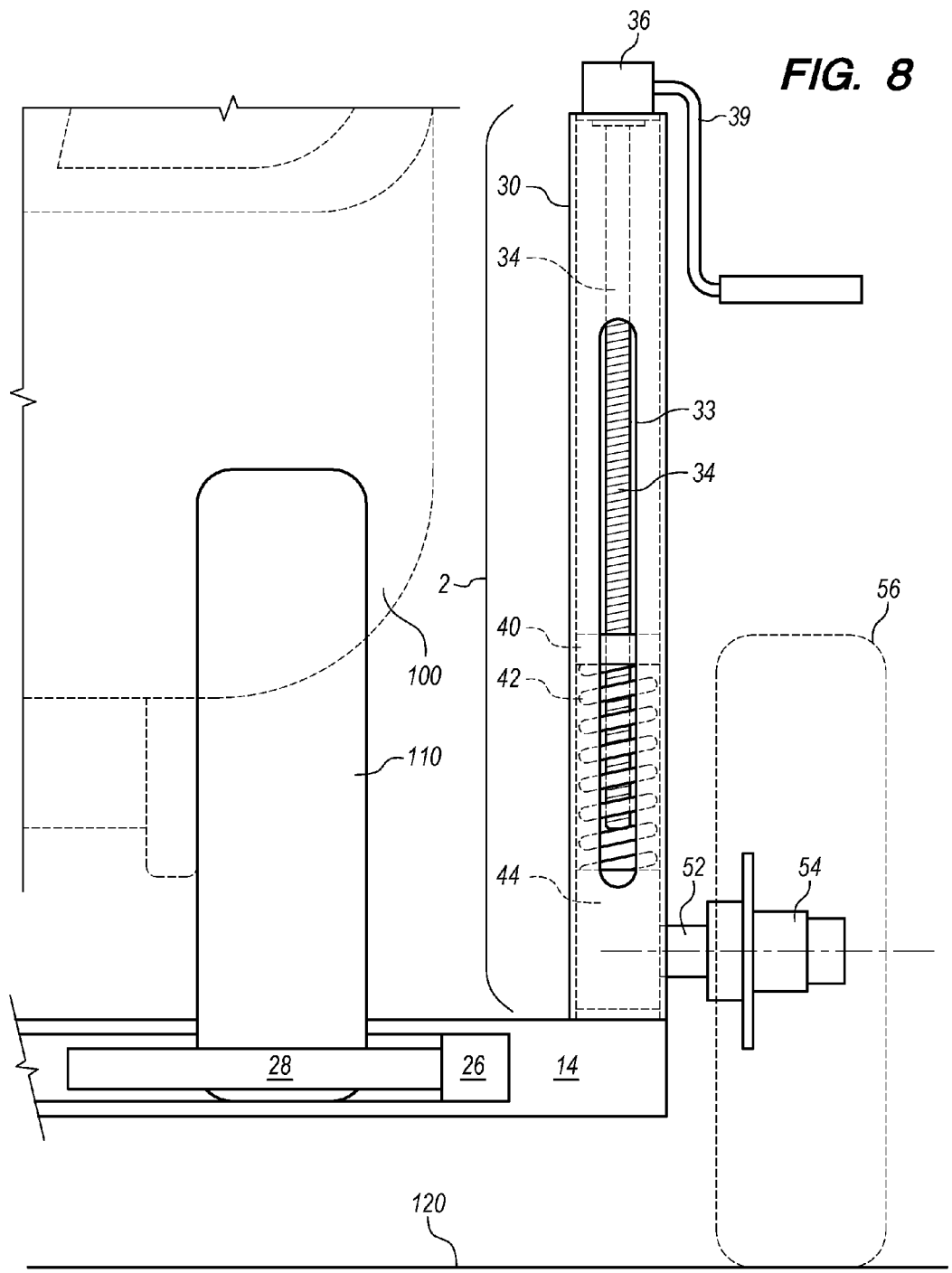
FIG. 8 is a blow-up cutaway view of a hub and suspension assembly for tow dolly and car hauler trailer with drop-down capability on a tow dolly, in the second mode with side cradle bars mounted on the outside, with hub and suspension assembly for tow dolly and car hauler trailer with drop-down capability in the raised position, with cradle assembly raised above road surface.

When lower non-threaded block 44 is lowered to its bottom position, as depicted in FIG. 7, suspension assembly for tow dolly and car hauler trailer with drop-down capability 2 is in its raised position. The raised position of suspension assembly for tow dolly and car hauler trailer with drop-down capability 2 is used when traveling or towing a cargo vehicle 100. When lower non-threaded block 44 is raised to its top position, as depicted in FIG. 8, suspension assembly for tow dolly and car hauler trailer with drop-down capability 2 is in its lowered position. The lowered position of suspension assembly for tow dolly and car hauler trailer with drop-down capability 2 is used to load and unload a cargo vehicle 100 onto tow dolly 4. When suspension assembly for tow dolly and car hauler trailer with drop-down capability 2 is in the lowered position, the lower end of suspension tower 30 contacts the road surface 120.

With tow dolly 4 attached to the tow vehicle (not depicted) and the first and second suspension assemblies for tow dolly and car hauler trailer with drop-down capability 2 in the lowered position, one may load a cargo vehicle 100 onto tow dolly 4 by simply driving the front tires 110 of the cargo vehicle 100 onto the cradle assembly of tow dolly 4. This occurs by driving the two front tires 110 of the cargo vehicle 100 over the first and second rear cradle bars 28 to contact the first and second front cradle bars 22. Then the first and second rear cradle bars 28 are slid forward, by adjustment of the first and second telescopic bars 26, to contact the front tires 110 of the cargo vehicle 100. The first and second rear cradle bars 28 are then locked into place with a locking mechanism. Any known locking mechanism may be used. When locked in place, cradle assembly functions to cradle or secure front tire 110 of the cargo vehicle 100 onto tow dolly 4. Both suspension assemblies for tow dolly and car hauler trailer with drop-down capability 2 must be raised to the raised position for transporting or towing the cargo vehicle 100. This occurs by rotating first and second screws 34 counterclockwise to lower first and second lower non-threaded blocks 44. After reaching the destination, both suspension assemblies for tow dolly and car hauler trailer with drop-down capability 2 must be lowered to the lowered position in order to unload the cargo vehicle 100. This occurs by rotating first and second screws 34 clockwise to raise first and second lower non-threaded blocks 44.

Tow dolly 4 may further comprise a tongue receiver 12 and a tongue member 10. Tongue receiver is a standard trailer hitch receiver that is rigidly attached to the frame member 14 of tow dolly 4. Tongue member 10 is an elongated trailer tongue that is used to reversibly attach to a trailer hitch ball. Tongue member 10 may be about 1-10 feet long.

Car hauler trailer 6 comprises: a plurality of frame members 14; a first, second, third, and fourth hub and suspension assembly for tow dolly and car hauler trailer with drop-down capability 2; and a first, second, third, and fourth wheel and tire assembly 56. First, second, third, and fourth hub and suspension assembly for tow dolly and car hauler trailer with drop-down capability 2 are welded, fastened, glued, or epoxied to a frame member 14 of car hauler trailer 6. The lower ends side of first, second, third, and fourth suspension tower 30 is welded, fastened, glued, or epoxied to a frame member 14, as depicted in FIGS. 9-15.

Figure 9:
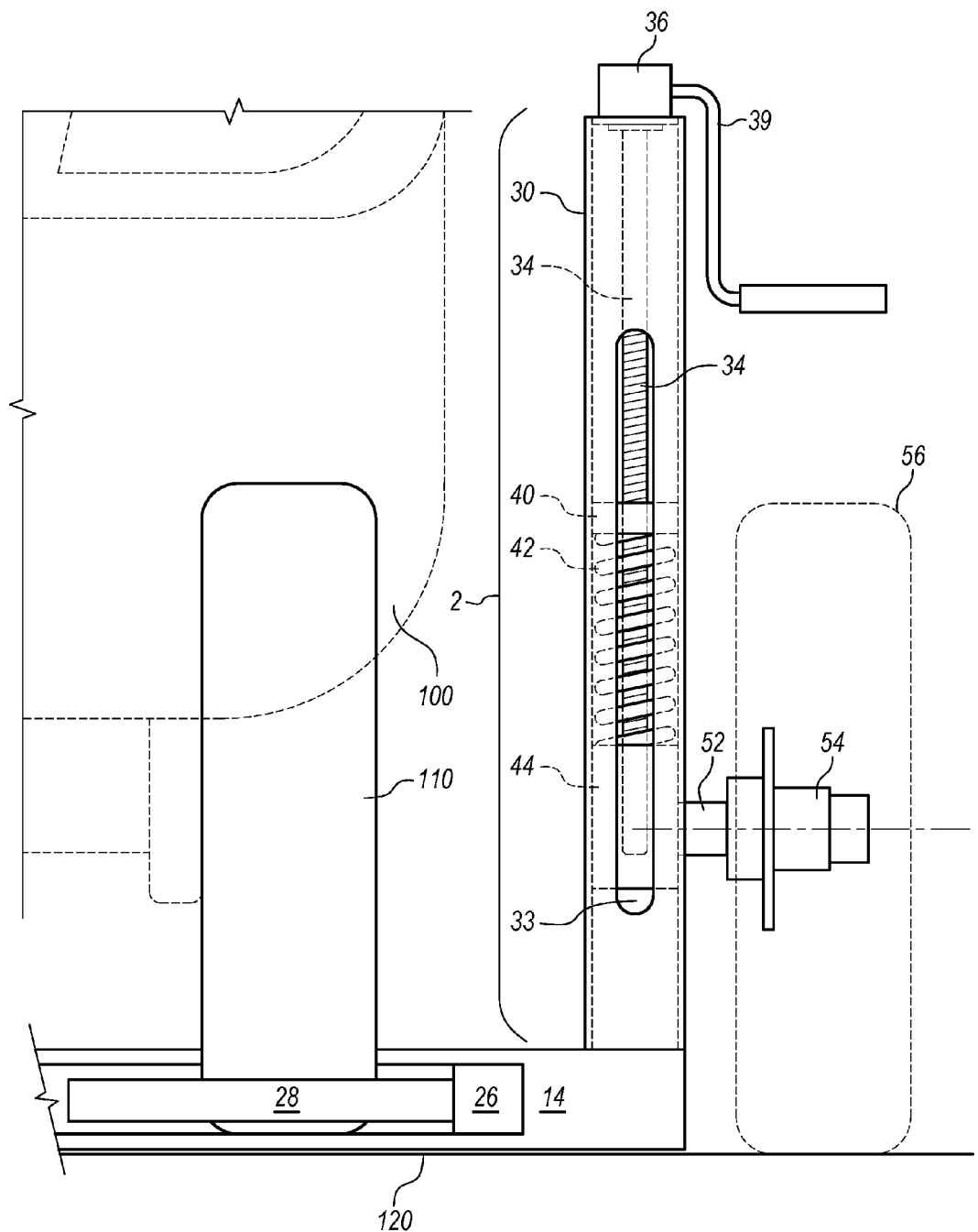
FIG. 9 is a blow-up cutaway view of a hub and suspension assembly for tow dolly and car hauler trailer with drop-down capability on a tow dolly, in the second mode with side cradle bars mounted on the outside, with hub and suspension assembly for tow dolly and car hauler trailer with drop-down capability in the lowered position, with cradle assembly lowered to contact the road surface.
Figure 10:
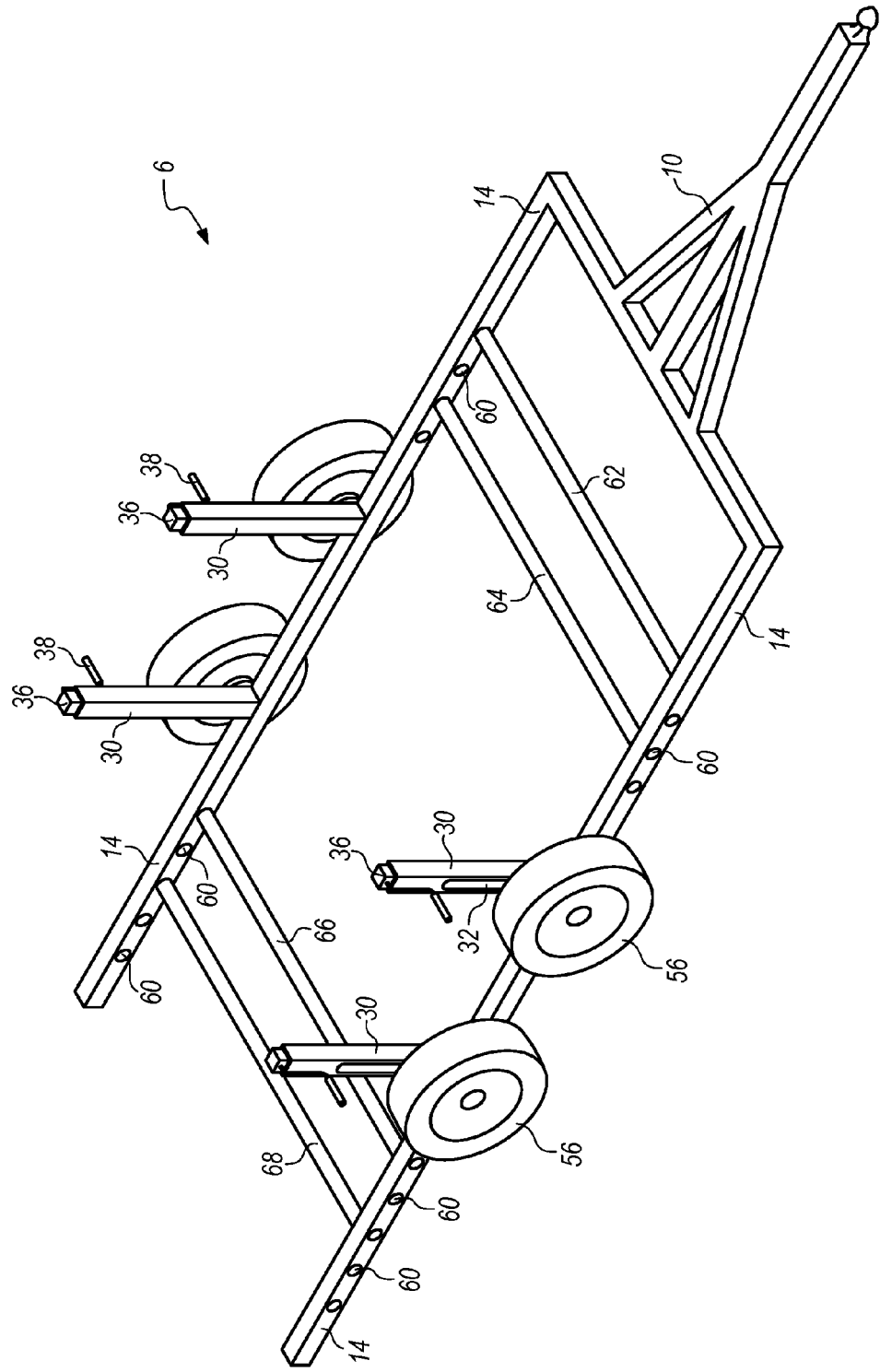
FIG. 10 is a top perspective view of a car hauler trailer with four hub and suspension assemblies for tow dolly and car hauler trailer with drop-down capability wherein all four hub and suspension assemblies for tow dolly and car hauler trailer with drop-down capability are in the raised position.
Figure 11:
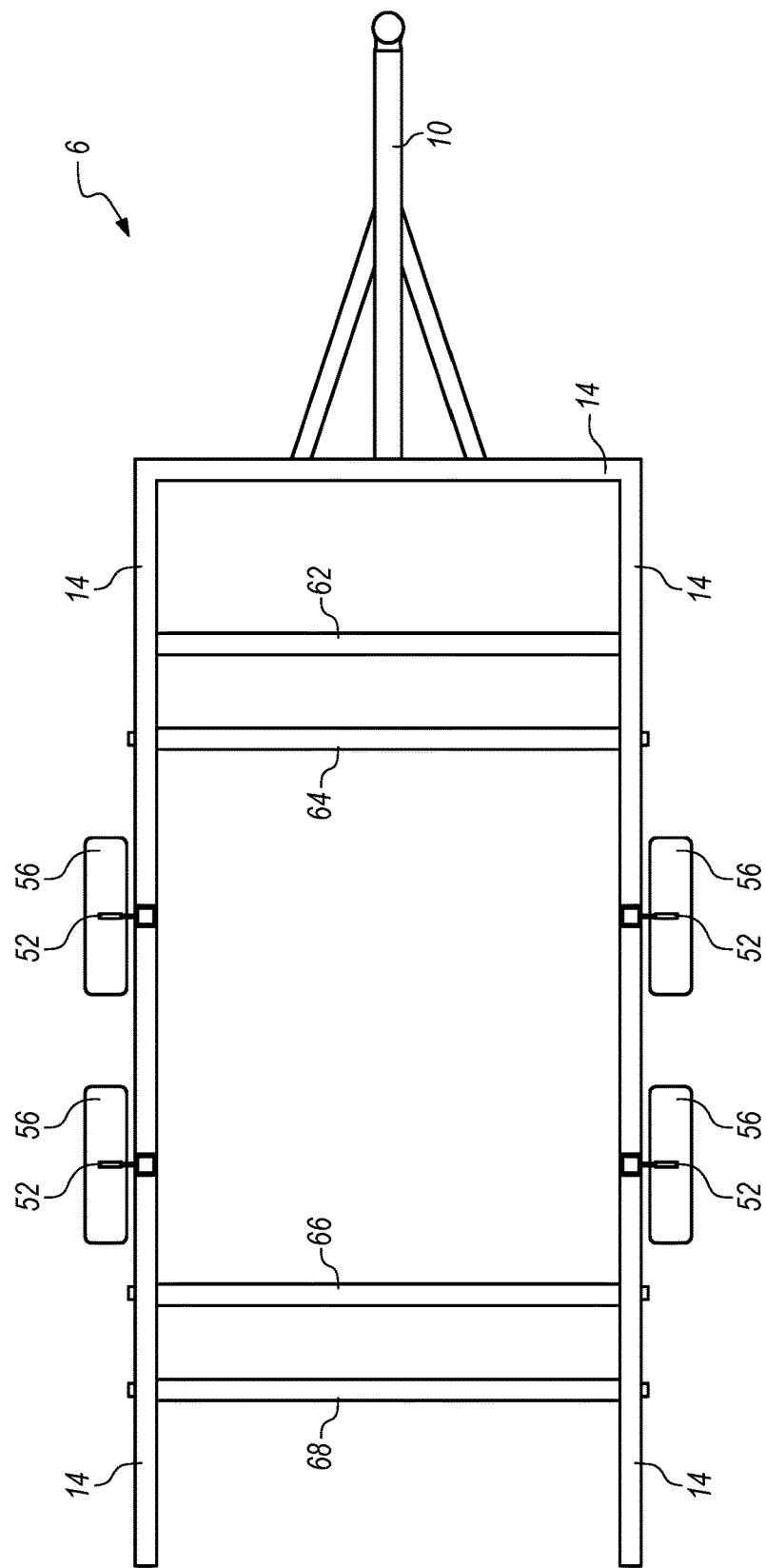
FIG. 11 is a top plan view of a car hauler trailer with four hub and suspension assemblies for tow dolly and car hauler trailer with drop-down capability.
Figure 12:
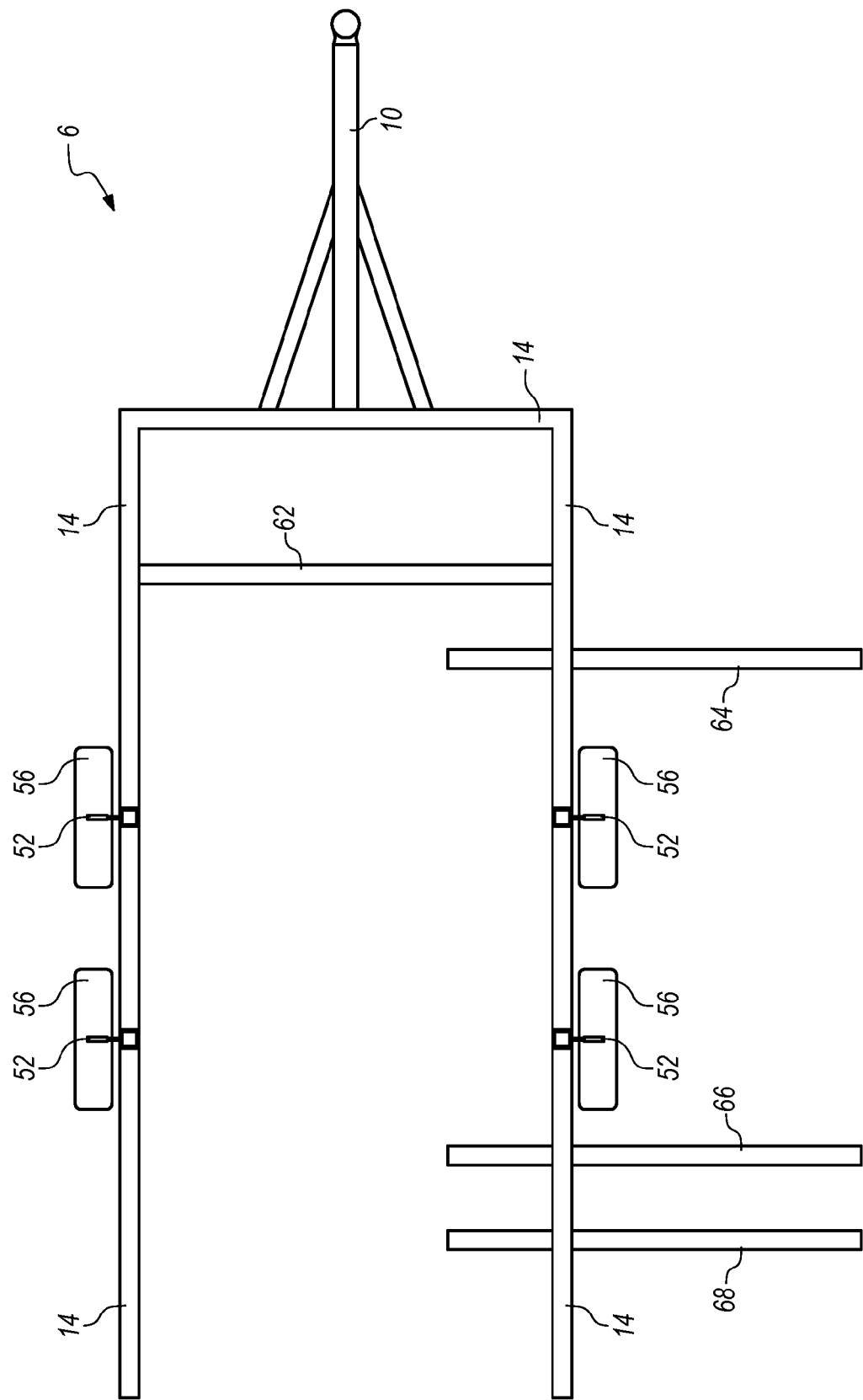
FIG. 12 is a top plan view of a car hauler trailer with four hub and suspension assemblies for tow dolly and car hauler trailer with drop-down capability with front wheel front cradle bar, a front wheel rear cradle bar, a rear wheel front cradle bar, and a rear wheel rear cradle bar partially removed from car hauler trailer.

Car Hauler trailer 6 further comprises: a front wheel front cradle bar 62, a front wheel rear cradle bar 64, a rear wheel front cradle bar 66, a rear wheel rear cradle bar 68, and a plurality of cradle bar adjustment holes 60. Front wheel front cradle bar 62, front wheel rear cradle bar 64, rear wheel front cradle bar 66, and rear wheel rear cradle bar 68 are each rigid solid horizontal cylindrical members with a diameter and a first and second end. The first a second ends of front wheel front cradle bar 62 are rigidly attached to a frame member 14 as depicted. Cradle bar adjustment holes 60 are located in frame members 14 as depicted. Each cradle bar adjustment hole 60 is a cylindrical hole in frame member 14 with an inner diameter. The diameter of front wheel rear cradle bar 64, rear wheel front cradle bar 66, and rear wheel rear cradle bar 68 is sized to make a clearance-fit with the inner diameter of cradle bar adjustment hole 60. Front wheel rear cradle bar 64, rear wheel front cradle bar 66, and rear wheel rear cradle bar 68 can be removeably attached to and inserted through cradle bar adjustment holes 60. Front wheel rear cradle bar 64, rear wheel front cradle bar 66, and rear wheel rear cradle bar 68 are installed onto car hauler trailer 6 by inserting them into respective cradle bar adjustment holes 60 as depicted in FIGS. 9 and 10. Front wheel rear cradle bar 64, rear wheel front cradle bar 66, and rear wheel rear cradle bar 68 are removed from car hauler trailer 6 by removing them from respective cradle bar adjustment holes 60 as depicted in FIG. 11.

Figure 15:
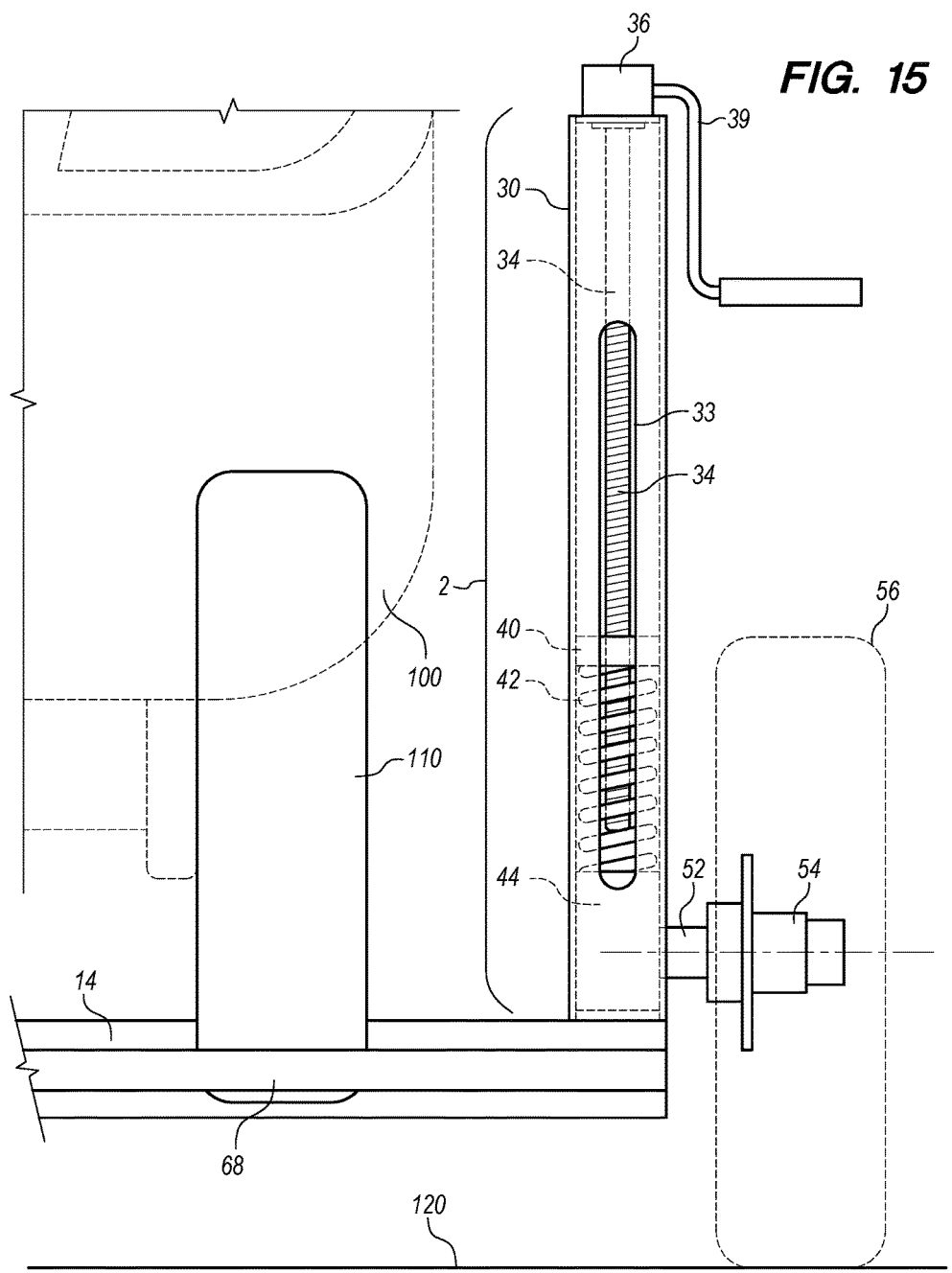
FIG. 15 is a blow-up cutaway view of a hub and suspension assembly for tow dolly and car hauler trailer with drop-down capability on a car hauler trailer, with hub and suspension assembly for tow dolly and car hauler trailer with drop-down capability in the raised position, with cradle bars raised above road surface.

With car hauler trailer 6 attached to the tow vehicle, with first, second, third, and fourth suspension assemblies for tow dolly and car hauler trailer with drop-down capability 2 in the lowered position, as depicted in FIGS. 13 and 15, and with front wheel rear cradle bar 64, a rear wheel front cradle bar 66, and a rear wheel rear cradle bar 68 removed from car hauler trailer 6, one may load a cargo vehicle 100 onto car hauler trailer 6 by simply driving cargo vehicle 100 forward until its front tires 110 contact front wheel front cradle bar 62. Next, the front wheel rear cradle bar 64 is installed through two cradle bar adjustment holes 60 so that front wheel rear cradle bar 64 is positioned just behind the front tires 110 of the cargo vehicle 100 and in contact with the front tires 110 of the cargo vehicle 100. Next, the rear wheel front cradle bar 66 is installed through two cradle bar adjustment holes 60 so that rear wheel front cradle bar 66 is positioned just in front the rear tires 110 of the cargo vehicle 100 and in contact with the rear tires 110 of the cargo vehicle 100. Next, the rear wheel rear cradle bar 68 is installed through two cradle bar adjustment holes 60 so that rear wheel rear cradle bar 68 is positioned just behind the rear tires 110 of the cargo vehicle 100 and in contact with the rear tires 110 of the cargo vehicle 100. Next, first, second, third, and fourth hub and suspension assembly for tow dolly and car hauler trailer with drop-down capability 2 must be raised to the raised position in order to travel with or tow the cargo vehicle 100. After reaching the destination, this procedure is reversed in order to unload the cargo vehicle 100.

What is claimed is:

1. A hub and suspension assembly comprising: a suspension tower; a screw; a chuck; a lug member; an upper threaded block; a spring; a lower non-threaded block; an axle; and a hub, wherein, said suspension tower is a vertical rigid hollow rectangular cuboid member with an upper side, a front side, a rear side, an inside side, and an outside side, wherein each said side has an upper end, an upper half, a lower end, and a lower half, said outer surface of said suspension tower has a notched window that is an oblong hole or slot-shaped with an upper end and a lower end, said upper end of said notched window is located at said upper half of said outside surface of said suspension tower, said lower end of said notched window breaks through said lower end of said outer surface of said suspension tower to form a notch, said screw is a rigid vertical cylindrical member with a height, a diameter, an upper end, a lower end, and an exterior surface with a helical male thread running from its said lower end to its said upper end, said chuck is a means to mechanically link or connect said screw to said lug member, said chuck has an upper end and a lower end, said lug member is a rigid oblong member with a lower end and an upper end, said upper threaded block is a rigid rectangular cuboid member with a width, a depth, a height, a top surface, a bottom surface, a front surface, a rear surface, an inside surface, an outside surface, and a threaded cavity with a helical female thread running from its said top surface to its said bottom surface, said spring is a vertical coil spring with a height, an outer diameter, an inner diameter, an upper end, and a lower end, said lower non-threaded block is a rigid rectangular cuboid member with a width, a depth, and a height, a top surface, a bottom surface, a front surface, a rear surface, an inside surface, an outside surface, and a cylindrical cavity running from its said top surface to its said bottom surface, said axle is a rigid horizontal cylindrical member with an inside end and an outside end, said hub is a wheel hub with an inside side and an outside side, said inside end of said axle is rigidly attached to said outside surface of said lower non-threaded block, said outside end of said axle is rigidly attached to said inside side of said hub, said upper end of said screw is threaded into said threaded cavity on said bottom surface of said upper threaded block and rotated until said upper end of said screw protrudes through said threaded cavity on said top surface of said upper threaded block, said lower end of said chuck is rigidly attached to said upper end of said screw, said upper end of said chuck is rigidly attached to said lower end of said lug member, said upper end of said spring is placed over said lower end of said screw and slid upwards until said upper end of said spring contacts said bottom surface of said upper threaded block, said lower end of said screw is passed through said cylindrical cavity on said top surface of said lower non-threaded block and said lower non-threaded block is slid upwards until said top surface of said lower non-threaded block contacts said lower end of said spring, and said upper end of said screw with rigidly attached said chuck are inserted into said lower end of said suspension tower and slid upwards until said chuck contacts said upper side of said suspension tower wherein said axle and said hub are guided into said notch of said notched window.

2. A hub and suspension assembly as recited in claim 1 further comprising: a handle member that is a hand crank with a handle end and a socket end wherein said handle end has a handle and said socket end has a socket that is capable of engagement with or mating with said lug member.

3. A tow dolly comprising: a first and a second hub and suspension assembly as recited in claim 2; a first and a second wheel and tire assembly, and a plurality of frame members, wherein said first wheel and tire assembly is rigidly attached to said first hub and suspension assembly, said second wheel and tire assembly is rigidly attached to said second hub and suspension assembly, and said plurality of frame members is rigidly attached to each other, to said first hub and suspension assembly, and to said second hub and suspension assembly.

4. A car hauler trailer 6 comprising: a first, a second, a third, and a fourth hub and suspension assembly as recited in claim 2; a first, a second, a third, and a fourth wheel and tire assembly; and a plurality of frame members, wherein said first wheel and tire assembly is rigidly attached to said first hub and suspension assembly, said second wheel and tire assembly is rigidly attached to said second hub and suspension assembly, said third wheel and tire assembly is rigidly attached to said third hub and suspension assembly, said fourth wheel and tire assembly is rigidly attached to said fourth hub and suspension assembly, and said plurality of frame members is rigidly attached to each other, to said first hub and suspension assembly, to said second hub and suspension assembly, to said third hub and suspension assembly, and to said fourth hub and suspension assembly.

5. A hub and suspension assembly as recited in claim 1 further comprising: an electric motor, a pneumatic motor, or a hydraulic motor wherein said electric motor, pneumatic motor, or hydraulic motor is a motor with a socket member that is capable of engagement with or mating with said lug member.

6. A tow dolly comprising: a first and a second hub and suspension assembly as recited in claim 5; a first and a second wheel and tire assembly, and a plurality of frame members, wherein said first wheel and tire assembly is rigidly attached to said first hub and suspension assembly, said second wheel and tire assembly is rigidly attached to said second hub and suspension assembly, and said plurality of frame members is rigidly attached to each other, to said first hub and suspension assembly, and to said second hub and suspension assembly.

7. A car hauler trailer 6 comprising: a first, a second, a third, and a fourth hub and suspension assembly as recited in claim 5; a first, a second, a third, and a fourth wheel and tire assembly; and a plurality of frame members, wherein said first wheel and tire assembly is rigidly attached to said first hub and suspension assembly, said second wheel and tire assembly is rigidly attached to said second hub and suspension assembly, said third wheel and tire assembly is rigidly attached to said third hub and suspension assembly, said fourth wheel and tire assembly is rigidly attached to said fourth hub and suspension assembly, and said plurality of frame members is rigidly attached to each other, to said first hub and suspension assembly, to said second hub and suspension assembly, to said third hub and suspension assembly, and to said fourth hub and suspension assembly.

8. A tow dolly comprising: a first and a second hub and suspension assembly as recited in claim 1; a first and a second wheel and tire assembly, and a plurality of frame members, wherein said first wheel and tire assembly is rigidly attached to said first hub and suspension assembly, said second wheel and tire assembly is rigidly attached to said second hub and suspension assembly, and said plurality of frame members is rigidly attached to each other, to said first hub and suspension assembly, and to said second hub and suspension assembly.

9. A car hauler trailer 6 comprising: a first, a second, third, and a fourth hub and suspension assembly as recited in claim 1; a first, a second, a third, and a fourth wheel and tire assembly; and a plurality of frame members, wherein said first wheel and tire assembly is rigidly attached to said first hub and suspension assembly, said second wheel and tire assembly is rigidly attached to said second hub and suspension assembly, said third wheel and tire assembly is rigidly attached to said third hub and suspension assembly, said fourth wheel and tire assembly is rigidly attached to said fourth hub and suspension assembly, and said plurality of frame members is rigidly attached to each other, to said first hub and suspension assembly, to said second hub and suspension assembly, to said third hub and suspension assembly, and to said fourth hub and suspension assembly.

* * * * *